Sept. 3, 1946.   L. A. MAXSON   2,407,088
CONTROLLING MECHANISM

Original Filed Aug. 13, 1941   4 Sheets-Sheet 1

Inventor:

Louis A. Maxson

Sept. 3, 1946.  L. A. MAXSON  2,407,088
CONTROLLING MECHANISM
Original Filed Aug. 13, 1941  4 Sheets-Sheet 2

Inventor:
Louis A. Maxson

Sept. 3, 1946. L. A. MAXSON 2,407,088
CONTROLLING MECHANISM
Original Filed Aug. 13, 1941 4 Sheets-Sheet 3
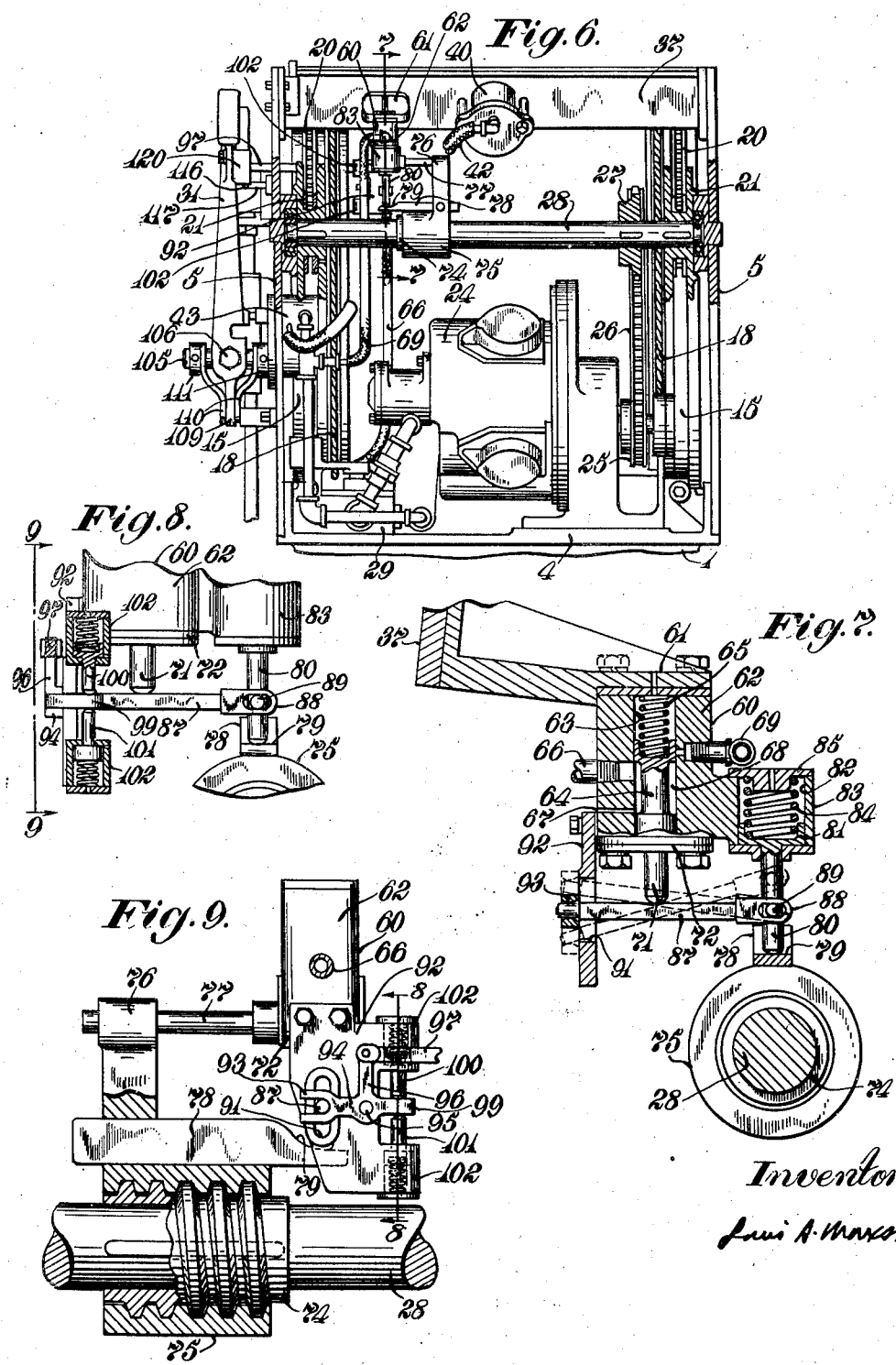
Inventor:
Luis A. Maxson.

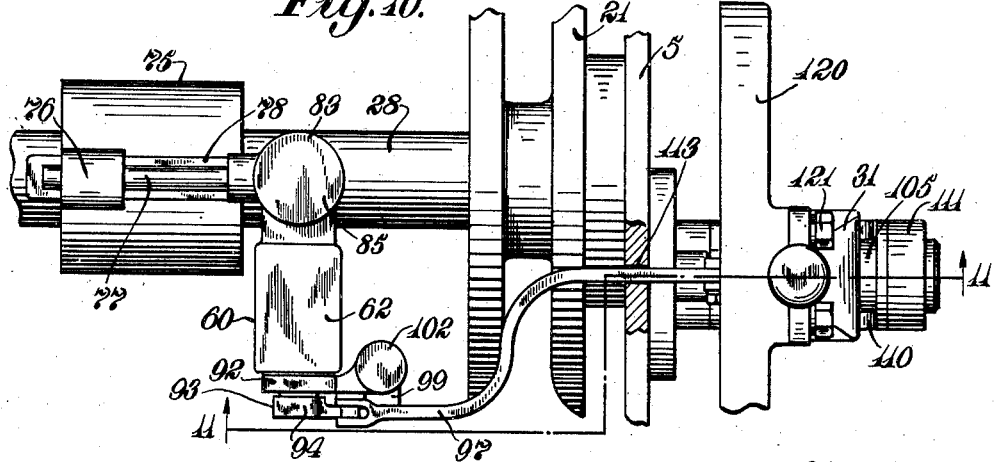
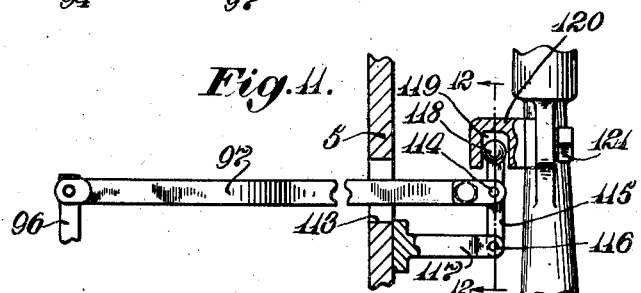
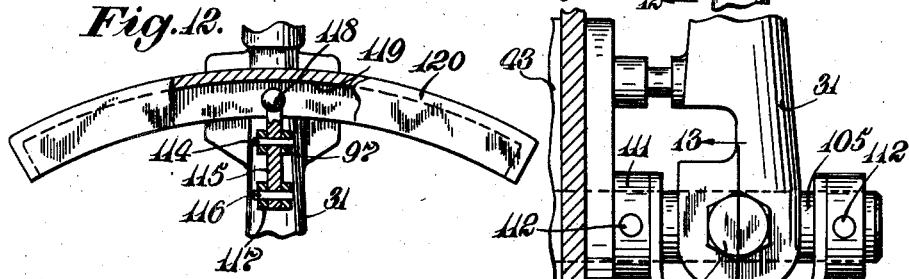
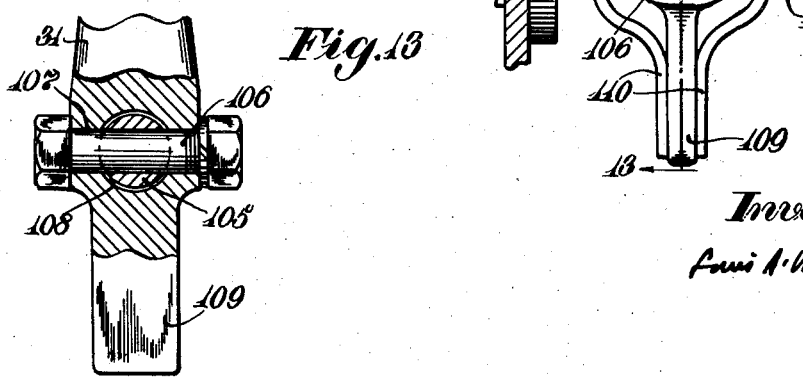

Patented Sept. 3, 1946

2,407,088

UNITED STATES PATENT OFFICE 2,407,088

CONTROLLING MECHANISM

Louis A. Maxson, Claremont, N. H., assignor to Joy Manufacturing Company, a corporation of Pennsylvania Original application August 13, 1941, Serial No. 406,645. Divided and this application May 20, 1942, Serial No. 443,776

9 Claims. (Cl. 214—132)

This application is a division of my copending application Serial No. 406,645, filed August 13, 1941, Material-loading apparatus.

My invention relates to controlling apparatus, and more particularly to controlling apparatus for valves or other controlling devices wherein both manual and automatic controls are provided.

It is desirable to provide, for certain automatically controlled mechanisms, controlling means which not only cause the automatically controlled operation to take place at a predetermined time in an operating cycle, but which also have available means whereby such operation may be caused to take place ahead of the time at which it would automatically occur, and also may be prevented from occurring at such time, whenever it is desired for any reason to prevent the same. It is also desirable to have available control mechanism of the foregoing type which, having been operated to delay the occurrence of the normally automatically effected operation, may be caused to effect such operation at a later point in the cycle of the apparatus for which the control is provided. Such controlling mechanisms may advantageously be employed in valve gears and in numerous other places, but a very highly advantageous use therefor is in connection with so-called mine car loaders, and I shall describe my invention as applied to an apparatus of that character.

In mine car loaders the shovelling mechanism of the loader is commonly swively mounted on the loader base to permit adjustment horizontally into material digging positions, either in line with the path of travel of the base or at either side of the latter. Ordinarily, the shovel of such loaders is moved manually horizontally relative to the base to the desired digging position, and when the shovel has been advanced in the material to be loaded so that it is filled to the desired degree with material, it is swung upwardly a short distance to clear the pile of material, and thereafter, as the shovel continues its upward movement, it is quite commonly automatically moved laterally during its further upward swinging movement so that by the time it reaches discharge position it will be moving in upright planes parallel to the longitudinal center line of the loader base. Such automatic self-centering means usually operates automatically to center the shovel each time the latter approaches discharging position, and accordingly loading on sharp curves may be difficult because the car to receive the shovel contents may be out of line with the shovel base. Moreover, the time of self-centering is relatively fixed.

By the use of my invention it is possible to make the time of self-centering virtually wholly selective, that is to say, the operator may cause self-centering to occur at any time he wishes. Moreover, the operator may prevent self-centering from occurring at all if he so desires, or, indeed, he can, even though the upward swinging movement of the shovel may have started, still preclude self-centering's taking place. From the description of my invention as applied to a mine car loader, its advantages in other fields of use will be readily appreciated.

It is an object of my invention to provide an improved controlling apparatus. It is another object of my invention to provide an improved controlling apparatus for devices having automatic controlling means whereby the timing of the operations normally controlled by said automatic controlling means may be altered. It is a further object of my invention to provide an improved controlling apparatus in which manual and automatic controlling devices are combined in a manner to permit automatic control at a predetermined moment in a cycle of a mechanism, with manual control at will prior to such moment, and with manual prevention of such operation either until subsequent to such moment or throughout the entire cycle of movement which would normally automatically effectuate such operation. It is a further object of my invention to provide an improved controlling apparatus operative to effect a given operation at a predetermined time but equipped with auxiliary control means so that such operation may be occasioned by power at any time, either ahead of the time when this would automatically be effected, or at a later time, or not at all. Yet another object of my invention is to provide an improved automatic and manual control mechanism, whether for a valve or any other controlling element. Other objects and advantages of the invention will hereinafter more fully appear.

In the accompanying drawings, in which for purposes of illustration one form which my invention may assume in practice is disclosed, Fig. 1 is a side elevational view of a mine car loader in which an illustrative embodiment of the invention is incorporated, showing a mine car coupled to the loader base.

Fig. 6 is an enlarged cross sectional view, with parts broken away, taken substantially on the line 6—6 of Fig. 3.

Fig. 7 is an enlarged detail vertical sectional view taken on the line 7—7 of Fig. 6.

Fig. 8 is a fragmentary view, with parts shown in section, on the plane of the line 8—8 of Fig. 9.

Fig. 9 is a detail elevational view taken on the line 9—9 of Fig. 8, with parts shown in section.

Fig. 10 is a plan view of portions of the improved controlling means.

Fig. 11 is a view with parts shown in section on the plane of the line 11—11 of Fig. 10 and with other parts shown in elevation.

Fig. 12 is a fragmentary view of a portion of the improved control mechanism shown in part in elevation and in part on the plane of the section line 12—12 of Fig. 11.

Fig. 13 is an enlarged fragmentary sectional view on the plane of the line 13—13 of Fig. 11.

Figure 1:
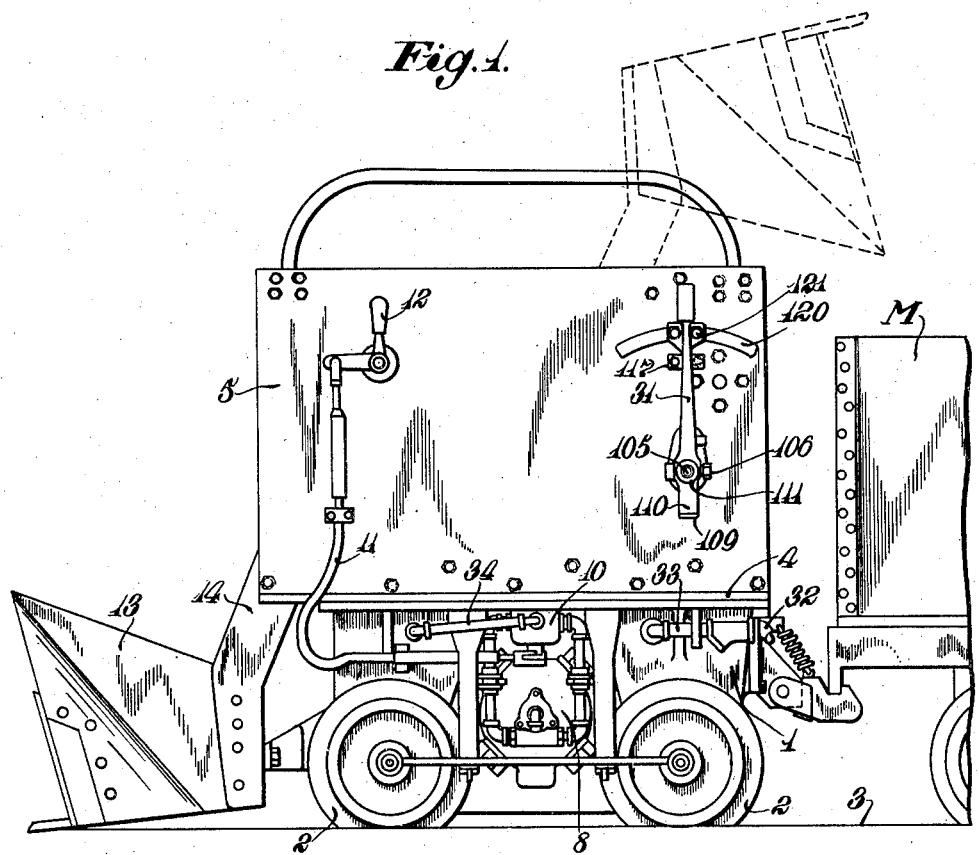
Figure 2:
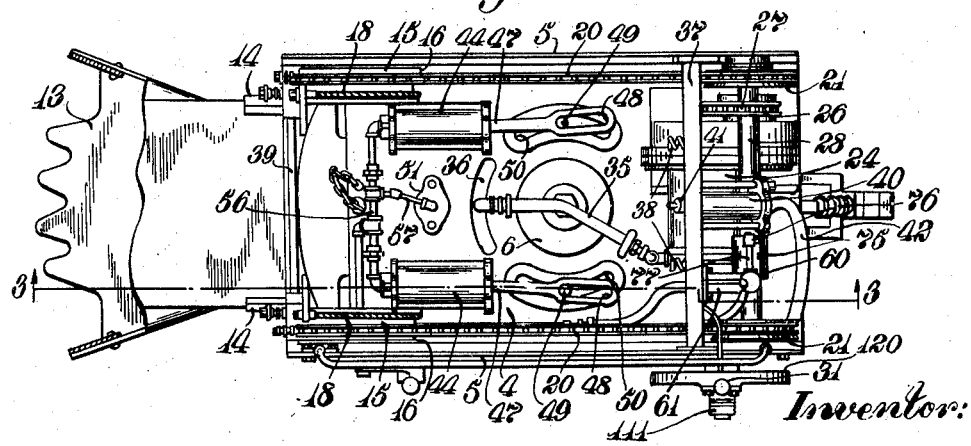
Fig. 2 is a plan view of the mine car loader shown in Fig. 1, with a portion of the shovel broken away.

As heretofore indicated, my improved controlling apparatus may be applied in various fields and to many uses, but for purposes of illustration, the same will be described as incorporated in a mine car loader of the type commonly known as a "muck loader," for loading loose muck or the like in metal mines, since, in my application Serial No. 406,645, filed August 13, 1941, now Patent No. 2,332,522 granted Oct. 26, 1943, for Material-loading apparatus, of which application this present case is a division, the invention specifically claimed in this present application is illustrated as incorporated in a material loading apparatus.

The mine car loader with which the present invention is illustrated in use includes a self-propelled base, herein a truck frame 1, mounted on wheels 2 adapted to run along a trackway 3 laid on the mine floor. The frame 1 has swivelly mounted thereon for horizontal swinging movement relative thereto an upper frame 4 on which the shovelling mechanism is mounted. The horizontally swivelled upper frame 4 has upstanding side plates or walls 5, 5, and is mounted for turning movement by means of a bearing device 6 supported on a vertical shaft 7 fixed to the truck frame. A reversible fluid operated motor 8 is provided for driving the truck wheels in either direction at will, and the motor 8 has a conventional reversing valve 10 operable through a flexible push-pull connection 11 by means of a conveniently located handle 12.

Figure 3:
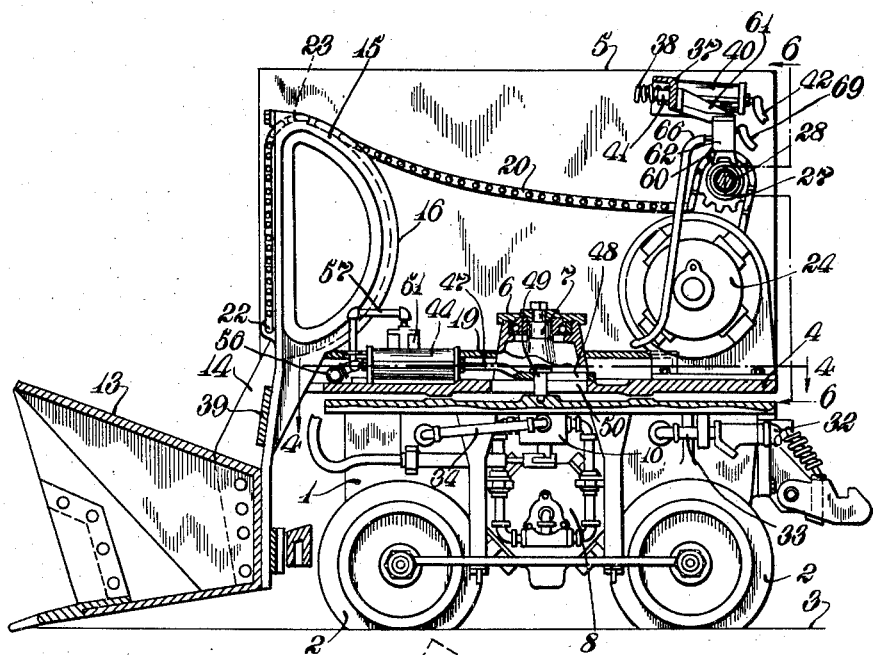
Fig. 3 is a view in longitudinal vertical section taken substantially on the line 3—3 of Fig. 2, and with parts broken away and others omitted.

The shovel mechanism illustrated includes a shovel or dipper 13 supported by parallel supporting arms 14 mounted on semi-circular rockers 15. These rockers have arcuate bearing surfaces 16 supported by and adapted to roll along parallel horizontal guideways 17 extending longitudinally of the swivel frame 4. The rockers are yieldingly retained on the guideways 17 by pairs of cables 18, 19 passing around arcuate guiding grooves on the rockers 15 and each secured at one end to the swivel frame 4 while having its opposite end connected by spring connections to the rockers. These cables retain the rockers 15 against displacement from the guideways 17 while at the same time compelling rolling movement of the rockers as the latter move along the guideways and causing the shovel to travel through the desired path. To swing the shovel between filling and emptying positions, shovel-moving means, herein in the form of flexible chains 20 adapted to be wound on flanged drums 21, is provided, and one end of each chain is fastened to the drums while the other ends of the chains are secured at 22 to the rockers at the ends of the latter nearer the supporting arms 14. The intermediate portions of the shovel raising chains 20, when the shovel is in its lower digging positions shown in Fig. 3, pass around arcuate guiding surfaces 23 on the rockers at points on the latter most remote from the shovel, so that when the chains are wound in by the drums the shovel is swung upwardly from its digging position and rearwardly towards its raised dumping position. A reversible fluid operated motor 24 mounted on the swivel frame 4 is operatively connected to rotate the chain winding drums 21 through driving connections including a drive sprocket 25 on the motor power shaft connected by an endless drive chain 26 to a sprocket 27 keyed to a shaft 28 on which the drums 21 are keyed.

The drive shaft 28 is horizontally disposed and extends transversely between the vertical side walls 5 of the swivel frame, and is suitably journaled in bearings supported by the frame side walls, as shown in Fig. 6. The motor 24 may be controlled by a conventional reversing valve 29 similar to the reversing valve 10, and may be controlled through lever connections operable by a handle 31.

Operating fluid for the motors 8 and 24 is delivered through a supply hose 32 connected to pipe connections 33 arranged on the truck frame beneath the swivel frame 4 and connected through a branch connection 34 to the reversing valve 10 of the motor 8. The pipe connections 33 also have a branch connection 35 extending vertically through an arcuate slot 36 in the swivel frame 4, this slot permitting turning movement of the swivel frame relative to the stationary pipe connections on the truck frame. The pipe connection 35 is connected to the reversing valve 29 of the shovel swinging motor 24. A transverse member 37 extends between the vertical side walls 5 of the swivel frame 4 near the rear end of the latter and carries shock absorbing buffer springs 38, and when the shovel is swung upwardly on its rocker mounting past its center of gravity, a cross plate 39 secured to the rocker arms 14 engages the buffer springs, and thus this plate and the buffer springs provide a yielding stop for the shovel. Upon the relatively abrupt stopping of the rearward swinging movement of the shovel by the buffer springs, the material in the shovel is discharged into a waiting mine car M shown in Fig. 1 upon the trackway 3 immediately to the rear of the loader and preferably coupled with the latter. To initiate the return movement of the shovel, a fluid operated return cylinder 40 is provided on the transverse member 37, and the piston rod 41 associated with the piston (not shown) of this cylinder extends forwardly through the front cylinder head. A pipe 42 connected to the casing of a valve device 43, which is also operated by the handle 31, serves for the supply of pressure fluid to the rear end of the cylinder. On pressure fluid supply to the rear end of cylinder 40, the piston contained therein is moved outwardly to bring the piston rod into engagement with the cross plate 39 on the shovel arms, and upon continued forward movement of the piston the shovel is moved forwardly across vertical "dead center," and the shovel thereafter swings downwardly under the action of the initial impetus derived from the thrust of the piston and the acceleration of gravity towards its lower digging position under the control of the drums 21 and the chain 20. Prior to the return movement of the shovel, the reversing valve 29 is of course manipulated to reverse the shovel swinging motor 24, and by the proper control of the motor 24 the downward swinging movement of the shovel may be controlled. It will be understood that when the lever is moved to actuate the reversing valve 29 to effect reversal of the motor 24, the valve device 43 is concurrently moved to effect a supply of pressure fluid to the return cylinder 40.

It will be observed that the mechanism of the mine car loader heretofore described follows very closely, with the exception of a difference in the manner of mounting the control handle 31 which will later be more fully explained, the construction illustrated in the R. C. Osgood Patent No. 2,201,671.

Figure 4:
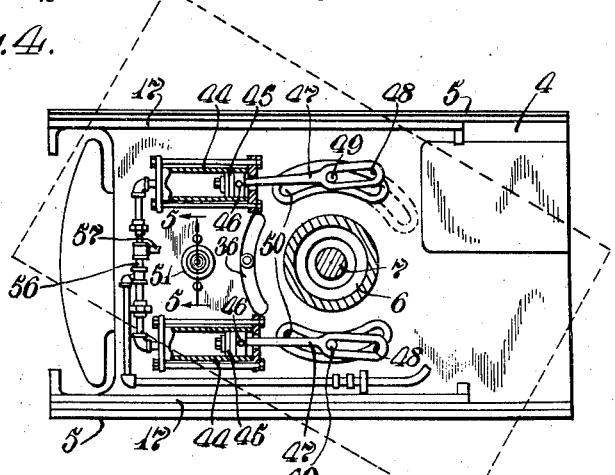
Fig. 4 is a horizontal sectional view taken substantially on the line 4—4 of Fig. 3, with parts omitted to facilitate illustration.
Figure 5:
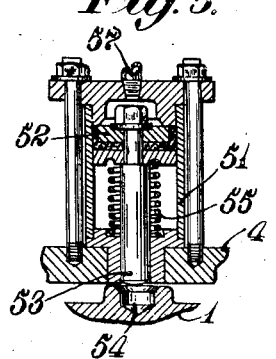
Fig. 5 is an enlarged vertical detail sectional view taken on the line 5—5 of Fig. 4.

For the control of the self-centering movements of the shovel relative to the truck frame as the shovel swings upwardly from its lower digging position towards its raised dumping position, there are provided parallel fluid cylinders 44, 44 supported on the swivel frame 4 and each containing a reciprocable piston 45. Each of the pistons 45 has pivotally connected thereto at 46 a connecting rod 47 having a slotted end 48. Extending into the slots of the connecting rods are vertical pins 49 fixed to the truck frame 1 and projecting upwardly through arcuate slots 50 in the swivel frame 4, these latter slots permitting turning of the swivel frame relative to the relatively stationary pins. When the shovel is in the laterally located digging position with the swivel frame 4 in the position indicated in dotted lines in Fig. 4, a supplying of pressure fluid to the forward ends of the cylinders will cause that one of the cylinders which is moved rearwardly relative to its piston during the lateral swinging of the frame 4 to act to return the frame 4, together with the shovel mechanism, into alinement with the mine car M, thus assuring proper discharge of the shovel contents into the mine car. A fluid operated lock is provided for automatically locking the shovel frame against movement with respect to the truck frame when the shovel is in its alined position, and this lock comprises a vertical cylinder 51 (Fig. 5) carried by the swivel frame and containing a reciprocable piston 52 having a locking pin 53 extending downwardly through the bottom cylinder head. This locking pin is adapted to enter a locking recess 54 on the truck frame when the locking pin is brought into registry therewith. A spring 55 normally maintains the locking pin in raised position. Pressure fluid may be supplied to the forward ends of the centering cylinders 44 through pipe connections 56, and a branched pipe 57 is connected to the upper head of the locking cylinder 51 so that whenever pressure fluid is supplied to the centering cylinders 44 it is also supplied to the locking cylinder 51.

The control of the fluid supply to the centering and locking cylinders is accomplished by means of a valve mechanism 60 which corresponds in some respects, though not in its control, to the valve mechanism illustrated, described and claimed in the patent to Robert C. Osgood, No. 2,268,569, granted Jan. 6, 1942. The valve mechanism 60 is supported, as shown in Fig. 7, by a bracket 61 secured to the transverse member 37, and comprises a valve casing 62 having therein an upright cylindrical bore 63 in which a piston type valve 64 is reciprocable. This valve is normally held in its lowermost position by a spring 65, and when in that position connects a line 66 which communicates with the pipe connections 56 and 57 with a vent 67, by means of a circumferential valve groove 68. When the valve 64 is in raised position, it connects a supply line 69 with the line 66. The valve 64 has an operating plunger 71 extending through an opening (not shown) in a lower cylinder head 72 secured to the bottom of the casing 62.

Means for automatically raising and permitting lowering of the plunger 71 is provided, this means being generally illustrated at the right hand side of Fig. 7, while at the other side of the valve mechanism from the automatic control means therefore there is arranged manual control means for the valve 64 effective selectively to preclude actuation thereof by the automatic means, or to effect manual operation of the valve 64 at any desired time.

Referring to Fig. 9, it will be observed that the transverse shaft 28 carries a screw 74 which is surrounded by a travelling nut 75, the nut being prevented from rotation by the coaction of a bored tang 76 thereon with a guide rod 77, and the nut carries adjustably secured thereto a cam member 78 having a cam portion 79 operative in certain positions of the nut 75 to act upon a plunger 80 and raise the latter to effect, as will shortly be described, the upward movement of the valve 64. The plunger 80 has an enlarged head 81 guided in a bore 82 formed in a lateral projection 83 integral with the casing 62. A spring 84 confined by a top head 85 for the bore 82 normally maintains the plunger 80 depressed. An actuating lever 87 is connected by means of a forked and slotted fitting 88 to a cross pin 89 carried by the plunger 80 so that the right hand end of the lever 87 shown in Fig. 7 will be raised and will swing the lever 87 counterclockwise about its left hand end when the cam 79 raises the plunger 80. The left hand end of the lever 87 projects through a slot 91 in a depending arm 92 fastened to the casing 62, and this left hand extremity is received in a fork 93 carried at the end of a pivoted bell crank lever 94 swingable about a pivot pin 95 mounted on the plate 92. The upper end of the upright arm 96 of the bell crank lever is adapted to be swung by a push and pull connection 97. The bell crank lever has a third arm 99 which is adapted normally to maintain the arm 94 in a horizontal position, a position in which the lever 87 will be horizontal unless the plunger 80 is raised by the cam 79. The arm 99 is engaged by the stems 100 and 101 of opposed spring-pressed plunger devices 102, these devices being so constructed that each is adapted to return the left hand end of the lever 87 to a predetermined position when it is displaced in one direction therefrom, but so that when the lever 87 is horizontal the net effect of the plungers 100 and 101 is to hold the rod stationary in that position.

For the purpose of operating the push-pull connection, so-called, the lever 87 may be controlled by the handle 31. The reversing valve 29 has an operating shaft or rod 105 by which it may be rotated, and the handle 31 is pivotable about a transverse pivot 106, herein a bolt, extending through the shaft 105 and through openings 107 formed in the handle 31 at opposite sides of an opening 108 therein. The lower end of the handle 31 terminates in the depending projection 109 which is engaged at its opposite sides by spring fingers 110 carried by collars 111 pinned as at 112 on the valve operating shaft 105. These spring fingers normally maintain the handle 31 vertical, but the handle may be swung about the pivot bolt 106 in planes extending transversely of the apparatus. The push-pull rod 97 passes through an opening 113 in the adjacent side plate 5 and is pivotally connected at 114 to an upright lever 115 which is fulcrumed at its lower end at 116 on a bracket 117 projecting outwardly from the adjacent side wall 5 of the swivel frame. The upper end of the lever 115 has herein a ball head 118 which is received in an arcuate slot 119 formed in an arcuate member 120 secured to the handle 31 as by bolts 121 near the upper end of the handle. The provision of the arcuate member 120 enables transverse swinging movement of the handle 31 to take place while maintaining an operative connection between the handle and the push-pull rod 97.

The mode of operation of the improved controlling apparatus above described will be clearly apparent from what has been said. It will be evident, referring particularly to Figs. 7 to 13, that the lever 31 may be swung in planes perpendicular to the axis of the valve operating shaft 105 to control the reversing valve device 29 and thereby control the raising and lowering of the shovel without in any way affecting the operation of the self-centering means, and if the swing of the handle 31 is in planes perpendicular to the axis of the valve operating shaft 105, the control of the self-centering means will be wholly automatic, for the lever 87 will pivot about a stationary fulcrum at its left hand end within the fork 93 of the then stationary bell crank lever, as seen in Fig. 7; and upon the movement of the cam 79 beneath the stem 80 the right hand end of the lever 87 will be raised and the valve 64 moved upwardly to a position to supply air to the self-centering cylinders 44 at a predetermined point in the elevation of the shovel. Should it be desired to prevent the centering of the shovel altogether by the automatic means, the handle 31 may be thrust laterally towards the adjacent side wall 5 and through the connection 118, 119, the lever 115, the push rod 97 and the bell crank lever 94, the left hand end of the lever 87 may be depressed to the lower dotted line position shown in Fig. 7, under which condition full upward movement of the plunger 80 will be inadequate to move the intermediate portion of the lever 87 which engages with the stem 71 upwardly enough to lift the valve 64 to a position to connect the supply line 69 and the control line 66. It will be noted, moreover, that if it were desired to initiate self-centering under manual control before this would occur automatically, the handle 31 may be pulled outwardly at its top and through the linkage and lever mechanism described, the left hand end, referring to Fig. 7, of the lever 87 could be raised and the valve 64 moved upwardly to connect the supply line 69 and the control line 66 even while the plunger 80 is in its lowermost position with respect to the cam.

As a result of this invention, an improved controlling means is provided which, in the specific embodiment illustrated, is especially adapted for the control of the self-centering mechanism of a material loading apparatus, and by means of which in this specific embodiment illustrated the shovel may be centered with respect to the loader base as the shovel swings upwardly towards its discharge position either under automatic or under manual control. It will further be evident that by the association of the manual control with the automatic control, the control connections are rendered comparatively simple and foolproof. Also, by the provision of the improved control means, the automatic operation may be interrupted at the will of the operator. It will further be evident that I have provided an improved automatic and manual control device adapted to other purposes than the one illustrated, and in which an automatic control can be anticipated in its control function, can be rendered incapable of performing its control function, or put out of operation after its control function is initiated, all under manual control.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a controlling mechanism for an element which is adapted to undergo a plurality of movements in different directions, separate means operative simultaneously for moving said element in said directions, a valve for controlling movement of said element in one of said directions, means automatically operative at a predetermined point of movement of said element in another of said directions for actuating said valve to position the same for the effecting of the movement controlled thereby, and manually controlled means for taking the control of said valve away from said automatic means including a manually operable controlling element operable at will and selectively positionable to preclude the aforesaid actuation of said valve at said predetermined point of movement of said element or to cause such valve movement to take place before said element reaches said predetermined point.

2. In a controlling mechanism for an element which is adapted to undergo a plurality of movements, a controlling valve for one of said movements, means automatically operative at a predetermined point in another of said movements for actuating said valve to position the same for the effecting of the movement controlled thereby, and manually controlled means for taking the control of said valve away from said automatic means, said valve having an operating lever, said automatic means comprising a device for actuating said lever to swing the same to effect valve movement, and said manually controlled means comprising means for shifting the position of said lever selectively to neutralize the motion of said lever by said device or to actuate said valve.

3. In a controlling mechanism for an element which is adapted to undergo a plurality of movements, a controlling valve for one of said movements, means automatically operative at a predetermined point in another of said movements for actuating said valve to position the same for the effecting of the movement controlled thereby, and manually controlled means for taking the control of said valve away from said automatic means, said valve having an operating lever, said automatic means comprising a device for actuating one end of said lever to swing the same, and said manually controlled means comprising means for swinging the other end of said lever selectively to neutralize the motion of said lever by said device or to actuate said valve.

4. In a controlling mechanism for an element which is adapted to undergo a plurality of movements, a controlling valve for one of said movements, means for actuating said valve including a lever having its mid portion operatively engaging said valve and having its ends adjustably supported by supports, means automatically operative at a predetermined point in another of said movements for varying the adjustment of the support at one end of said lever, and manually controlled means for selectively adjusting the support at the other end of said lever.

5. In combination, in a controlling apparatus for a device having a working movement, a mounting permitting the direction of said working movement to be changed and means for changing such direction by power, an element for controlling the operation of the means for changing the direction of movement by power, an automatic control for said element governed by the working movement of said device, and a superimposed manual control for said element including a single control element positionable at will selectively to render said automatic control ineffective or to effect actuation of said means for changing the direction of movement by power at different points in said working movement.

6. In a controlling apparatus, a swingable lever movable about an axis perpendicular to a series of planes, means mounting said lever for swinging about an axis lying in one of said planes, means for normally causing the swinging movement of said lever to be confined to said planes, an element to be controlled, a device for controlling the same movable in one direction to effect a predetermined control of said element and in an opposite direction to interrupt said control, means automatically operative on a predetermined occurrence to effect the first mentioned movement of said device, and means operable by movement of said lever about said second mentioned axis for anticipating said predetermined occurrence in effecting the first mentioned movement of said device.

7. In a controlling apparatus, a swingable lever movable about an axis perpendicular to a series of planes, means mounting said lever for swinging about an axis lying in one of said planes, means for normally causing the swinging movement of said lever to be confined to said planes, an element to be controlled, a device for controlling the same movable in one direction to effect a predetermined control of said element and in an opposite direction to interrupt said control, means automatically operative on a predetermined occurrence to effect the first mentioned movement of said device, and means operable by movement of said lever about said second mentioned axis for offsetting the operation of said automatically operative means whereby upon such predetermined occurrence said automatically operative means does not effect the first mentioned movement of said device.

8. In a controlling mechanism for an apparatus which is adapted to go through different movements, a valve for controlling one of said movements, means for actuating said valve including a lever having its mid portion operatively engaging said valve and having its ends adjustably supported by supports, means responding to one of the movements of said apparatus for varying the adjustment of the support at one end of said lever, and manually controlled means for adjusting the support at the other end of said lever.

9. In a controlling mechanism for an element which is adapted to undergo a plurality of movements, a valve for controlling one of said movements, means including a lever operatively engaging said valve between its own ends and adjustably supported by supports at its ends for actuating said valve, means automatically operative at a predetermined point in another of said movements for varying the adjustment of the support at one end of said lever and positioning said valve to institute the movement controlled thereby, and manually controlled means for adjusting the support at the other end of said lever to render said automatic means ineffective or to actuate said valve prior to the attainment of said element to said predetermined point.

LOUIS A. MAXSON.